United States Patent [19]

Pilger et al.

[11] Patent Number: 4,746,681

[45] Date of Patent: May 24, 1988

[54] MOLDED POLYUREA ARTICLES AND A PROCESS FOR THE PRODUCTION THEREOF

[75] Inventors: Friedhelm Pilger, Cologne; Reinhold Franzen, Leverkusen, both of Fed. Rep. of Germany; Wolfgang Reichmann, Pittsburgh, Pa.

[73] Assignee: Bayer Aktiengesellschaft, Leverkusen, Fed. Rep. of Germany

[21] Appl. No.: 36,834

[22] Filed: Apr. 10, 1987

[30] Foreign Application Priority Data

Apr. 25, 1986 [DE] Fed. Rep. of Germany ....... 3613973

[51] Int. Cl.$^4$ ............................................. C08G 18/14
[52] U.S. Cl. ...................................... 521/51; 264/51; 264/DIG. 14
[58] Field of Search ............ 521/51; 264/51, DIG. 14

[56] References Cited

U.S. PATENT DOCUMENTS

| | | | |
|---|---|---|---|
| 4,218,543 | 8/1980 | Weber et al. | 521/51 |
| 4,396,729 | 8/1983 | Dominquez et al. | 521/51 |
| 4,433,067 | 2/1984 | Rice et al. | 521/51 |
| 4,442,235 | 4/1984 | Taylor et al. | 521/122 |
| 4,444,910 | 4/1984 | Rice et al. | 521/51 |
| 4,569,982 | 2/1986 | Grogler et al. | 528/73 |

FOREIGN PATENT DOCUMENTS

| | | |
|---|---|---|
| 0081701 | 11/1982 | European Pat. Off. . |
| 0204246 | 5/1986 | European Pat. Off. . |
| 3215909 | 11/1983 | Fed. Rep. of Germany . |
| 3215907 | 11/1983 | Fed. Rep. of Germany . |

OTHER PUBLICATIONS

Becker/Braun, "Kunststoff-Handbuch 7", Polyurethane, Publishers, Dr. G. Oertel, 1983, pp. 325-333.

*Primary Examiner*—Maurice J. Welsh
*Attorney, Agent, or Firm*—Gene Harsh; Joseph C. Gil; Lyndanne M. Whalen

[57] ABSTRACT

Molded polyurea foam parts having densities of from 200 to 600 kg/m$^3$ and a compact skin are made by reacting a polyisocyanate component with a polyamine component in a closed mold at an isocyanate index of from 70 to 130. The polyamine component generally includes (1) an aminopolyether having a molecular weight of from 1800 to 12,000 and 2 to 3 isocyanate reactive groups of which at least 90% are aromatically bound primary and/or secondary amino groups, (2) an aromatic diamine, (3) a foaming agent and optionally (4) known auxiliaries and additives. The polyisocyanate component includes any aromatic di- and/or polyisocyanate. Parts produced by this process have excellent mechanical properties and a well-defined solid skin.

5 Claims, No Drawings

MOLDED POLYUREA ARTICLES AND A PROCESS FOR THE PRODUCTION THEREOF

BACKGROUND OF THE INVENTION

This invention relates to new flexible polyurea foam articles in the density range of from 200 to 600 kg/m$^3$ and a process for the production thereof.

The production of flexible polyurethane foam articles having a compact skin zone and an integral density distribution by foaming reaction mixtures based on organic polyisocyanates, polyether and/or polyester polyols and low molecular weight polyols as chain lengthening agents inside molds is known (see e.g. Becker/Braun, Kunststoff-Handbuch 7, Polyurethane, Publishers Dr. G. Oertel, Carl Hanser Verlag, Munich, 1983). The production of microcellular molded parts having densities above 800 kg/m$^3$ using certain aromatic diamines as chain lengthening agents (DE-AS No. 2,622,951) and/or using relatively high molecular weight compounds containing isocyanate reactive groups at least 50% of which are primary or secondary amino groups (EP-A Nos. 0,081,701, 0,093,861, 0,093,862 or DE-OS No. 3,215,909) is also known. The number of urea segments in the synthetic materials is increased by the use of amine starting components. The mechanical properties of the polyisocyanate polyaddition products can thus be improved. The production of molded parts on the basis of such urea-modified polyurethanes or of pure polyureas has, however, been restricted to the production of high density products with densities above 800 kg/m$^3$. This may be attributed to the fact that the reaction between the isocyanate groups and amino groups generally proceeds extremely rapidly so that the reaction which results in cross-linking is substantially completed before any foaming agents present can act. Therefore, all of the specific examples of molded parts described in the above-mentioned prior publications have densities above 800 kg/m$^3$. Although the production of cellular molded parts having a preferred density range of from 0.25 to 0.7 g/cm$^3$ is mentioned in the general description in DE-OS Nos. 3,215,907 and 3,215,909, the possibility of producing such foams from the aminopolyethers with aliphatically bound amino groups disclosed in these prior publications has not been documented.

SUMMARY OF THE INVENTION

It has now surprisingly been found that it is quite possible to produce flexible polyurea foam parts within the density range of from 200 to 600 kg/m$^3$ with a very distinct skin zone. Such foam parts are obtained if polyethers in which the isocyanate reactive groups are almost exclusively aromatically bound amino groups are used as the relatively high molecular weight compounds containing isocyanate reactive groups reacted with an aromatic di and/or polyisocyanate and if care is taken to ensure that the quantity of diamine chain lengthening agent used is not more than 10 wt. % based on the weight of those polyethers. The polyurea foam parts which are for the first time obtainable by this method are distinguished by excellent mechanical properties and a particularly distinct skin zone.

DETAILED DESCRIPTION OF THE INVENTION

The present invention relates to a process for the production of polyurea foam articles having densities in the range of 200 to 600 kg/m$^3$ and a compact skin zone. In this process a mixture of (a) a polyisocyanate component having at least one di- or polyisocyanate containing exclusively aromatically bound isocyanate groups, (b) a compound having a molecular weight (average) of from 1800 to 12,000 and containing at least two isocyanate reactive groups, (c) a diamine having a molecular weight of from 108 to 400 containing two primary and/or secondary aromatically bound amino groups, (d) a foaming agent and (e) optionally other auxiliary agents and additives known to those skilled in polyurethane chemistry are reacted in a closed mold. The isocyanate index is maintained within the range of 70 to 130 during reaction of these components. Component (b) is a polyether or mixture of polyethers having (on statistical average) 2 to 3 isocyanate reactive groups at least 90% of which are aromatically bound primary and/or secondary amino groups. Component (c) is used in a quantity of no more than 10 wt. %, based on the weight of component (b).

Polyisocyanate component (a) is any aromatic di- and/or polyisocyanate, i.e., any polyisocyanate in which the isocyanate groups are all aromatically bound. Examples of such compounds include 2,4- and/or 2,6-diisocyanatotoluene; 2,2'-, 2,4'-, and/or 4,4'-diisocyanatodiphenylmethane, and mixtures of these isomers with their higher homolog (such as the mixtures obtained from the known reaction of phosgenating aniline/formaldehyde condensates); reaction products containing urethane groups obtained by reaction of the above-mentioned di- and/or polyisocyanates with subequivalent quantities of aliphatic polyhydroxyl compounds in the molecular weight range of from 62 to 700 (e.g., ethylene glycol, trimethylolpropane, propylene glycol, dipropylene glycol or polypropylene glycols); di- and/or polyisocyanates modified by partial carbodiimidization of the isocyanate groups of the above-mentioned di- and/or polyisocyanates; methyl-substituted diisocyanates of the diphenylmethane series and mixtures thereof of the type described, for example, in EP-OS No. 0,024,665; or any mixtures of such aromatic di- and/or polyisocyanates.

The preferred isocyanate starting materials (a) include derivatives of 4,4'-diisocyanatodiphenylmethane which are liquid at room temperature, such as the polyisocyanates containing urethane groups obtainable according to DE-PS No. 1,618,380 (U.S. Pat. No. 3,644,457) by the reaction of 1 mol of 4,4'-diisocyanatodiphenylmethane with 0.05 to 0.3 mol of low molecular weight diols or triols (preferably polypropylene glycols having molecular weights below 700); and the diisocyanates based on 4,4'-diisocyanatodiphenylmethane containing carbodiimide and/or uretone imine groups obtainable, for example, according to U.S. Pat. Nos. 3,152,162, 3,384,653, 3,449,256, DE-OS No. 2,537,685 or EP-OS No. 5233. The corresponding modification products based on mixtures of 2,4'- and 4,4'-diisocyanatodiphenylmethane or mixtures of the above-described modified 4,4'-diisocyanatodiphenylmethanes with minor quantities of higher than difunctional polyisocyanates of the diphenylmethane series (for example, those of the type described in DE-OS No. 2,624,526) should also be counted among the preferred polyisocyanates. The preferred polyisocyanates are generally polyisocyanates or polyisocyanate mixtures of the diphenylmethane series which are liquid at room temperature and optionally chemically modified as described above and have an (average) isocyanate functionality of from 2 to 2.2, in particular 2.

Particularly preferred polyisocyanate mixtures of the diphenylmethane series are those containing from 25 to 65 wt. % of free 2,4'-diisocyanatodiphenylmethane.

Component (b) used in the present invention may be any polyether or mixture of polyethers which has a statistical average of 2 to 3 isocyanate reactive groups, preferably in end positions. At least 90% and preferably all of these groups are aromatically bound primary or secondary (preferably primary) amino groups. The molecular weight of the polyether (calculated from the functionality and the isocyanate-reactive group content) is in the range of 1800 to 12,000, preferably 2000 to 8000.

In addition to the aromatically bound amino groups which are essential to this invention, the polyethers may contain minor quantities of primary and/or secondary (preferably primary) hydroxyl groups. The number of these hydroxyl groups, however, must not be greater than 10%, based on the total number of isocyanate reactive groups. The presence of such hydroxyl groups may be due to incomplete conversion of polyether polyols into polyethers containing aromatically bound amino groups or to the fact that component (b) still contains small quantities of polyether polyols in addition to the polyethers which have exclusively aromatically bound amino groups.

It would be possible in principle, although it is by no means preferred, to use polyethers or polyesters with aliphatically bound amino groups in addition to the polyethers with exclusively aromatically bound amino groups which are essential for the invention but the presence of these polyethers or polyesters with aliphatically bound amino groups is only permissible under the condition that at least 90% of the isocyanate-reactive groups in component (b) must be aromatically bound amino groups.

The aromatic aminopolyethers required in the present invention are frequently mixtures of different polyether polyamines. The conditions stated above concerning the molecular weight and functionality of component (b) refer to the statistical average value when such mixtures are used.

In the polyethers according to the invention containing aromatically bound amino groups, the amino groups, which are preferably in end positions, may be attached to the polyether chain through urethane or ester groups. These "aminopolyethers" may be prepared by known methods, for example, those described in EP-A No. 79536, DE-A Nos. 2,948,419, 2,019,432, 2,619,840, U.S. Pat. Nos. 3,808,250, 3,975,428 or 4,016,143.

Diamine component (c) used in the process of the present invention may be any diamine in the molecular weight range of from 180 to 400 containing exclusively aromatically bound primary or secondary, preferably primary amino groups. These diamines preferably carry an alkyl substituent in at least one ortho-position to each amino group, more preferably at least one alkyl substituent in the ortho-position to the first amino group and two alkyl substituents (each having 1 to 4, preferably 1 to 3 carbon atoms) in the ortho-position to the second amino group. Those which have an ethyl, n-propyl and/or isopropyl substituent in at least one ortho-position to the amino groups and optionally methyl substituents in other ortho-positions to the amino groups are particularly preferred. Examples of such diamines include 1-methyl-3,5-diethyl-2,4-diaminobenzene, commercial mixtures thereof with 1-methyl-3,5-diethyl-2,6-diaminobenzene (which mixtures generally contain up to 35% by weight of the last mentioned isomer, based on the quantity of the mixture) 3,5,3',5'-tetraisopropyl-4,4'-diaminodiphenylmethane, 3,3'-diethyl-4,4'-diaminodiphenylmethane and mixtures of such diamines. Other suitable diamines include, for example, those mentioned as examples in the description of component (c) in DE-OS No. 3,147,736 and the aromatic diamines listed in EP-A No. 0,069,286.

In the process of the present invention, the diamines (c) are used in a quantity of no more than 10 wt. %, generally 2 to 10 wt. %, preferably 2 to 6 wt. %, based on the weight of component (b). Component (c) is preferably dissolved in component (b) to form the "polyamine component" of the process before the reaction according to the invention is carried out.

The foaming agent (d) used in the process of the invention is preferably any one of the "physical foaming agents" known from polyurethane chemistry. Such physical foaming agents are inert, readily evaporating compounds. Specific examples include: acetone, ethyl acetate, methylene chloride, chloroform, ethylidene chloride, vinylidene chloride, monofluorotrichloromethane, chlorodifluoromethane, dichlorodifluoro -methane, -butane, -hexane, -heptane and diethylether. The above-mentioned fluorinated chlorohydrocarbons are preferably used.

Inert gases such as nitrogen or air are also suitable foaming agents (d). These may be incorporated with the reaction mixture by mixing the individual reaction components with a separate stream of gas. Compounds which release gases at temperatures above room temperature for example, azo compounds which release nitrogen such as azo-isobutyric acid nitrile, also constitute suitable foaming agents (d). Further examples of foaming agents (d) useful in the practice of the present invention are described, for example, in "Kunststoffhandbuch", Vol. VII, published by Vieweg and Hochtlen, Carl-Hanser-Verlag, Munich 1966, pages 108, 109, 453–455 and 507–510.

In the process of the present invention, the preferred "physical foaming agents" (i.e. the volatile liquids mentioned above as examples), are preferably added to the "polyamine component" made up of a solution of component (c) in component (b). The foaming agents may also be incorporated with the polyisocyanate component (a).

Auxiliary agents and additives (e) which may optionally be used in the process of the present invention include, for example, the "internal mold release agents" known in the art. Such release agents are described, for example, in DE-OS No. 1,953,637 (=U.S. Pat. No. 3,726,952), DE-OS No. 2,121,670 (=GB No. 1,365,215), DE-OS No. 2,431,968 (=U.S. Pat. No. 4,098,731) and DE-OS No. 2,404,310 (=U.S. Pat. No. 4,058,492). The preferred mold release agents include: fatty acid salts which contain at least 12 carbon atoms and primary mono-, di- or polyamines containing two or more carbon atoms or amines containing amide or ester groups and having at least one primary, secondary or tertiary amino group which salts contain at least 25 aliphatic carbon atoms, saturated and/or unsaturated esters containing COOH and/or OH groups and obtained from mono- and/or polyfunctional carboxylic acids and polyfunctional alcohols having hydroxyl or acid numbers of at least 5; ester type reaction products of ricinoleic acid and long chained fatty acids; salts of carboxylic acids and tertiary amines, and natural and/or synthetic oils, fats or waxes.

The oleic acid or tall oil fatty acid salt of the amide-containing amine obtained by the reaction of N-dimethylaminopropylamine with oleic acid or tall oil fatty acid is particularly preferred.

Other mold release agents known in the art may in principle be used in the process according to the invention in addition to the preferred mold release agents mentioned above as examples. These other release agents may be used alone or together with the preferred mold release agents. These other mold release agents include, for example, the reaction products of fatty acid esters and polyisocyanates according to DE-OS No. 2,319,648; the reaction products of polysiloxanes containing reactive hydrogen atoms and mono- and/or polyisocyanates according to DE-OS No. 2,356,692 (=U.S. Pat. No. 4,033,912); esters of polysiloxanes containing hydroxymethyl groups and mono- and/or polycarboxylic acids according to DE-OS No. 2,363,452 (=U.S. Pat. No. 4,024,090); and salts of polysiloxanes containing amino groups and fatty acids according to DE-OS Nos. 2,427,273 or 2,431,968 (U.S. Pat. No. 4,098,731).

The above-mentioned internal mold release agents are used, if at all, in a total quantity of from 0.1 to 25 wt. %, preferably from 1 to 10 wt. %, based on the total quantity of reaction mixture.

Although no catalysts need be used for the reaction between isocyanate groups and isocyanate reactive groups of components (b) and (c) for the production of flexible polyurea integral foam parts from components (a) to (d) with the aid of the preferred mold release agents (e), catalysts of the kind known for the production of polyurethane foams and microcellular elastomers may nevertheless be included as additional auxiliary agents and additives (e).

Tertiary amines are among these optional catalysts. Suitable tertiary amines include: triethylamine, tributylamine, N-methyl-morpholine, N-ethylmorpholine, N-cocomorpholine, N,N,N',N'-tetramethylethylene diamine 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butanediamine, N,N-dimethylimidazole-$\beta$-phenylethylamine, 1,2-dimethyl-imidazole and 2-methyl-imidazole.

Organic metal catalysts, in particular organic tin catalysts such as tin-(II) salts of carboxylic acids (e.g., tin-(II)acetate, tin-(II)octoate, tin-(II) ethyl hexoate and tin-(II)laurate) and the dialkyl tin salts of carboxylic acids (such as dibutyl tin diacetate, dibutyl tin dilaurate, dibutyl tin maleate and dioctyl tin diacetate) may also be used, alone or in combination with the tertiary amines. Other examples of catalysts and details concerning their mode of action are described in Kunststoff-Handbuch, Volume VII, published by Vieweg and Hochtlen, Carl-Hanser-Verlag, Munich 1966, e.g. on pages 96 to 102.

The catalysts are used, if at all, in a quantity of about 0.001 to 10 wt. %, preferably 0.05 to 1 wt. %, based on component (b).

Surface-active additives (i.e. emulsifiers and foam stabilizers) may also be used in the present invention as additional components (e). Examples of suitable emulsifiers include, for example, the sodium salts of ricinoleic sulphonates or of fatty acids or salts of fatty acids with amines, such as oleic acid diethylamine and stearic acid diethanolamine. Alkali metal and ammonium salts of sulphonic acids such as dodecylbenzene sulphonic acid and dinaphthylmethane disulphonic acid or of fatty acids such as ricinoleic acid or of polymeric fatty acids may also be used as surface-active additives.

Water-soluble polyether siloxanes are the preferred foam stabilizers. These compounds generally have a copolymer of ethylene oxide and propylene oxide linked to a polydimethylsiloxane group. Foam stabilizers of this type are described, for example, in U.S. Pat. No. 2,764,565.

Other auxiliary agents and additives (e) optionally used in the process according to the invention include known cell regulators such as paraffins, fatty alcohols and dimethylpolysiloxanes; pigments, dyes and known flame-retarding agents (e.g., tris-chloroethylphosphate or ammonium phosphate and polyphosphate), stabilizers against aging and weathering, plasticizers and fungistatic and bacteriostatic substances as well as fillers such as barium sulphate, glass fibers, kieselguhr or whiting.

Other examples of additives optionally used according to the invention, including surface-active additives, foam stabilizers, flame retarding substances, plasticizers, dyes and fillers, fungistatic and bacteriostatic substances and details concerning the use and mode of action of these additives are described in Kunststoff-Handbuch, Volume VII, published by Vieweg and Hochtlen, Carl-Hanser-Verlag, Munich 1966, e.g. on pages 103 to 113.

The auxiliary agents and additives (e) optionally used are preferably incorporated with the "polyamine component".

When carrying out the process of the present invention, the quantity of polyisocyanate component is preferably calculated to provide an isocyanate index of from 70 to 130, in particular from 90 to 110 in the foamable mixture. By "isocyanate index" is meant the quotient of the number of isocyanate groups and the number of isocyanate-reactive groups multiplied by 100. Any isocyanate reactive groups present in the mold release agents (carboxyl groups) are not included in the calculation of the isocyanate index. The process of the present invention is preferably carried out by the known reaction injection molding process (RIM process) although it would be possible in principle to mix the reactants by some other method, for example by means of high speed laboratory stirrers. Regardless of the method of mixing used, two reactant components are generally employed, the polyisocyanate component (a) being the first component and the "polyamine component" (i.e. the mixture of components (b), (c) and (d)) constituting the second component. The optional components (e), if used, are generally added to the "polyamine component", although in some cases it may be advantageous to incorporate them with the polyisocyanate component (for example in the case of mold release agents containing isocyanate groups). It is, of course, possible in principle to use mixing heads which allow three or four separate components to be used in the process according to the invention so that it is not necessary to prepare a preliminary mixture of the individual components. The quantity of mixture introduced into the mold and the quantity of foaming agent (d) present in this mixture are calculated to produce molded products having a density of from 200 to 600 kg/m$^3$.

The starting temperature of the mixture introduced into the mold is generally chosen in the range of 20° C. to 50° C. The temperature of the mold is generally from 20° C. to 80° C., preferably from 40° C. to 60° C.

The products of the process of this invention may generally be removed from the mold after a dwell time of 2 to 10 minutes, preferably 2 to 5 minutes. The molded products obtained are distinguished by their excellent mechanical properties and a well defined, solid skin zone. They are suitable in particular for the manufacture of seating cushions, upholstery, arm rests, soft handles, shock absorbing edges, packaging material, safety parts of motor vehicles, parts of mountings, knee pads, bumpers, shoes, helmets, protective covers, boxing gloves and parts thereof.

The invention is further illustrated but is not intended to be limited by the following examples in which all parts and percentages are by weight unless otherwise specified.

EXAMPLES

The following abbreviations are used in these Examples:

Polyol I

Polyether polyol with OH number 56 prepared by the propoxylation of trimethylolpropane followed by ethoxylation of the propoxylation product (proportions by weight PO/EO=45:55).

Polyol II

Polyether polyol with OH number 28 prepared by the propoxylation of trimethylolpropane and ethoxylation of the propoxylation product (proportions by weight PO/EO=75:25).

Polyamine I

Aromatic aminopolyether mixture having an average NH functionality of 2.5 and average NH number of 47.4 prepared by hydrolysis of a thin-layer evaporated isocyanate prepolymer obtained from a polyether polyol with an OH number of 49 and excess 2,4-diisocyanatotoluene. The polyether polyol was an alkoxylation product of an equimolar mixture of trimethylolpropane and propylene glycol. The starter mixture was first propoxylated and the propoxylation product obtained was then ethoxylated (proportions by weight PO/EO=95:5).

Polyamine II

Aromatic aminopolyether with NH functionality 3 and NH number 27.5 prepared by hydrolysis of a thin layer evaporated isocyanate prepolymer obtained from propoxylated trimethylol propane with an OH number 32 and excess 2,4-diisocyanatotoluene.

Polyamine III

Polypropylene oxide polyether containing aliphatic amino end groups and prepared by amination of the hydroxyl end groups of polypropylene glycol, NH functionality=2, NH number=56.

Chain lengthening agent I

Mixture of 70 wt. % of 1-methyl-3,5-diethyl-2,4-diaminobenzene and 30 wt. % of 1-methyl-3,5-diethy-2,6-diaminobenzene.

Chain lengthening agent II

Diamine mixture made up of 60 parts by weight of 3,5-diethyl-3',5'-diisopropyl-4,4'-diamino-diphenylmethane, 20 parts by weight of 3,5,3',5'-tet -4,4'-diaminodiphenylmethane and 20 parts by weight of 3,5,3',5'-tetraisopropyl-4,4'-diaminodiphenylmethane prepared by the condensation of an equimolar mixture of 2,6-diethyl- and 2,6-diisopropyl-aniline with formaldehyde in a molar ratio of anilines to formaldehyde of about 2:1 followed by isolation of the diamine mixture from the reaction mixture by distillation.

Stabilizer

Commercial polyether polysiloxane stabilizer ("Stabilizer L 5305" of Union Carbide).

R 11

Monofluorotrichloromethane.

Catalyst

30% Solution of triethylenediamine in dipropylene glycol.

Polyisocyanate I

Mixture of 50 parts by weight of 2,4'- and 50 parts by weight of 4,4'-diisocyanatodiphenylmethane.

Polyisocyanate II

Urethane-modified polyisocyanate mixtures having an average isocyanate functionality of 2.2 and an isocyanate content of 28.5 wt. % prepared by reaction of a polypropylene glycol having an average molecular weight of 218 with a polyisocyanate mixture made up of 75 parts by weight of 4,4'-diisocyanatodiphenylmethane, 4 parts by weight of 2,4'-diisocyanatodiphenylmethane and 21 parts by weight of higher nuclear polyisocyanates of the diphenylmethane series.

To carry out the examples summarized in the Table below, the starting materials A entered in the Table were first combined to form the "polyamine component". Examples 1 to 5 are comparison examples in which a relatively high molecular weight polyols was used instead of a relatively high molecular weight polyamine. In Examples 1, 2, 3, 4, 5, 6, 10, 11 and 12, the polyisocyanates identified in the Table were added with vigorous stirring by means of a laboratory stirrer to the "polyamine component" prepared as described above while the isocyanate indexes shown in the Table were maintained. As soon as the reaction mixtures had been prepared, they were introduced at a temperature of about 25° C. into closable aluminum molds measuring 20×20×3 cm. These molds were maintained at a temperature of about 60° C. The internal walls of the mold had previously been coated with a mold release agent (Acmosil ® 180 ST 5 of Acmos, Bremen). The quantity of reaction mixture introduced into the mold was calculated to produce molded products having a density of 400 kg/m$^3$. In Examples 7, 8, and 9, a high pressure dosing apparatus (HK 45, Mixing head MQ 12 of Hennecke, Federal Republic of Germany) was used for mixing the reactants. When experiments were carried out with this machine, the temperature of the "polyamine component" was 45° C., the temperature of the polyisocyanate component was 25° C. and the temperature of the mold was 50° C. As regards the other measures, the experiments carried out in the machine conformed to the laboratory experiments of Examples 1-6 and 10-12. The molded products were in each case removed after a dwell time of 5 minutes in the mold. The products obtained in Examples 6 to 12 according to the invention were flexible molded foams which had a particularly pronounced surface layer.

Comparison Examples 1 to 4 show that when polyether polyols are used together with low molecular weight aromatic diamines, foams having a low gross density cannot be obtained. Comparison Example 5 shows that an aliphatic aminopolyether in combination with an aromatic diamine reacts too rapidly so that the foaming agent cannot develop its activity, i.e. the reaction mixture is not suitable for the production of a foam.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded polyurea part having a density of from 200 to 600 kg/m³ and a compact skin by reacting in a closed mold a mixture of
   (a) at least one diisocyanate or polyisocyanate having only aromatically bound isocyanate groups,
   (b) a polyether or mixture of polyethers having an average molecular weight of from 1800 to 12,000 containing 2 to 3 isocyanate-reactive groups of which at least 90% are aromatically bound primary and/or secondary amino groups,
   (c) a diamine having a molecular weight of from 180 to 400 having a primary and/or secondary aromatically bound amino groups which diamine is used in a quantity no greater than 10 wt. % based on weight of (b) and
   (d) a foaming agent in quantities such that an isocyanate index of from 70 to 130 is maintained.

2. The process of claim 1 in which (c) is used in a quantity of from 2 to 6 wt. % based on the weight of (b).

3. The process of claim 1 in which (a) is a diisocyanate of the diphenylmethane series.

4. The process of claim 1 in which the mixture further includes at least one additive selected from internal mold release agents, surface active additives, cell regulators, pigments, dyes, flame retarding agents, stabilizers against aging and weathering, plasticizers, fungistatic and bacteriostatic substances, fillers and foam stabilizers.

5. A molded polyurea part having a density of from 200 to 600 kg/m³ and a compact skin produced by the process of claim 1.

TABLE I

| | | | Example No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| A | Polyol I | P. Wt. | 94 | 94 | — | — | — | — | — | — | — | — | — | — |
| | Polyol II | P. Wt. | — | — | 94 | 94 | — | — | — | — | — | — | — | — |
| | Polyamine I | P. Wt. | — | — | — | — | — | 90 | 94 | 96 | 98 | 94 | — | — |
| | Polyamine II | P. Wt. | — | — | — | — | — | — | — | — | — | — | 96 | 90 |
| | Polyamine III | P. Wt. | — | — | — | — | 98 | — | — | — | — | — | — | — |
| | Chain lengthening agent I | P. Wt. | 6 | — | 6 | — | 2 | 10 | 6 | 4 | 2 | — | 4 | 10 |
| | Chain lengthening agent II | P. Wt. | — | 6 | — | 6 | — | — | — | — | — | 6 | — | — |
| | Stabilizer | P. Wt. | 0.2 | 0.2 | 0.2 | 0.2 | 0.2 | 0.2 | 0.2 | 0.2 | 0.2 | 0.2 | 0.2 | 0.2 |
| | Catalyst | P. Wt. | — | — | — | — | — | — | — | — | — | — | 0.5 | — |
| | Water | P. Wt. | — | — | — | — | 0.3 | 0.3 | 0.3 | 0.3 | 0.3 | — | 0.3 | 0.3 |
| | R 11 | P. Wt. | 15 | 15 | 15 | 15 | 15 | 15 | 15 | 15 | 15 | 15 | 15 | 15 |
| | Polyisocyanate I | P. Wt. | — | — | — | — | 20.2 | 29 | 23.5 | 21 | 18 | 17.5 | 16.5 | 25 |
| | Polyisocyanate II | P. Wt. | 25 | 17 | 17.4 | 12.5 | — | — | — | — | — | — | — | — |
| | Isocyanate Index | | 105 | 105 | 105 | 105 | 105 | 105 | 105 | 105 | 105 | 105 | 105 | 105 |
| | Starting/Setting time | s | −+ | −+ | −+ | −+ | ++ | 6/26 | 3/35 | 5/45 | 7/100 | 15/50 | 10/28 | 7/24 |

P. Wt. = Parts by weight
+ = do not foam no uniform reaction product is obtained
++ = does not foam the setting time of the non-foaming reaction mixture is about 1 s